(12) United States Patent
Hsieh et al.

(10) Patent No.: US 11,061,313 B2
(45) Date of Patent: Jul. 13, 2021

(54) WAVELENGTH CONVERSION MODULE, METHOD OF FORMING WAVELENGTH CONVERSION MODULE, ILLUMINATION SYSTEM AND PROJECTION APPARATUS

(71) Applicant: Coretronic Corporation, Hsin-Chu (TW)

(72) Inventors: Chi-Tang Hsieh, Hsin-Chu (TW); I-Hua Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/862,511

(22) Filed: Apr. 29, 2020

(65) Prior Publication Data

US 2020/0348585 A1    Nov. 5, 2020

(30) Foreign Application Priority Data

Apr. 30, 2019    (CN) .......................... 201910361084.4

(51) Int. Cl.
*G03B 21/20*    (2006.01)
*G03B 21/28*    (2006.01)

(52) U.S. Cl.
CPC ......... *G03B 21/28* (2013.01); *G03B 21/2033* (2013.01); *G03B 21/2066* (2013.01)

(58) Field of Classification Search
None
See application file for complete search history.

(56) References Cited

U.S. PATENT DOCUMENTS

2017/0153536 A1    6/2017   Saka et al.

FOREIGN PATENT DOCUMENTS

| CN | 103228761 | 7/2013 |
|---|---|---|
| CN | 103777447 | 5/2014 |
| CN | 103791453 | 5/2014 |
| CN | 103900035 | 7/2014 |
| CN | 204730123 | 10/2015 |
| CN | 208547769 | 2/2019 |
| CN | 109654391 | 4/2019 |
| CN | 210052008 | 2/2020 |

(Continued)

OTHER PUBLICATIONS

"Office Action of China Counterpart Application", dated Apr. 30, 2021, p. 1-p. 12.

*Primary Examiner* — Michelle M Iacoletti
*Assistant Examiner* — Danell L Owens
(74) *Attorney, Agent, or Firm* — JCIPRNET

(57) ABSTRACT

A wavelength conversion module including a substrate, a reflective layer and a wavelength conversion layer is provided. The reflective layer is located on the substrate, wherein the reflective layer has two first reflective regions and a second reflective region. The second reflective region is located between the two first reflective regions in a radial direction, and the distance from the top of the reflective layer in the second reflective region to the substrate is smaller than the distance from the top of the reflective layer in each of the first reflective regions to the substrate. The wavelength conversion layer is located on the substrate, wherein the reflective layer is located between the substrate and the wavelength conversion layer. In addition, an illumination system, a projection apparatus, and a method of forming a wavelength conversion module are also proposed.

20 Claims, 11 Drawing Sheets

(56) References Cited

FOREIGN PATENT DOCUMENTS

| WO | WO-2014109333 A1 * | 7/2014 | ........... A61B 1/0653 |
|----|---------------------|---------|-------------------------|
| WO | 2016192623 | 12/2016 | |
| WO | WO-2016192623 A1 * | 12/2016 | ................ F21V 9/45 |

* cited by examiner

WAVELENGTH CONVERSION MODULE, METHOD OF FORMING WAVELENGTH CONVERSION MODULE, ILLUMINATION SYSTEM AND PROJECTION APPARATUS

CROSS-REFERENCE TO RELATED APPLICATION

This application claims the priority benefit of China application serial no. 201910361084.4, filed on Apr. 30, 2019. The entirety of the above-mentioned patent application is hereby incorporated by reference herein and made a part of this specification.

BACKGROUND

Technical Field

The present disclosure relates to an optical module, a method of forming the same, and an optical system and an optical apparatus including the abovementioned optical member, and more particularly to a wavelength conversion module, a method of forming a wavelength conversion module, an illumination system, and a projection apparatus.

Description of Related Art

Recently, projection apparatuses featuring solid-state light sources such as light-emitting diode (LED) and laser diode have gradually become dominant in the market. The light-emitting efficiency of the laser diode is about 20% in comparison with the normal LED; in order to remove the limitation on the LED light source, phosphor has been excited by the laser light source, and thereby the pure color light source required by the projector is generated.

Generally, the process of manufacturing the existing phosphor wheel is to coat phosphor powder mixed with silicone on the substrate of the phosphor wheel to form a wavelength conversion layer of the phosphor wheel. On the other hand, the reflective layer of the existing phosphor wheel is a single type of structure, and can be made from one of the following two structures. One type of reflective layer is formed by plating a silver film, an aluminum film, a dielectric film or a mixture thereof on a heat-dissipating substrate by vacuum plating, and the other type of reflective layer is formed by coating diffusion reflective particles mixed with silicone on the heat-dissipating substrate through printing, spraying and dispensing.

However, the wavelength conversion layer made of silicone mixed with phosphor powder has low resistance to high-temperature and deterioration problem. Therefore, when the phosphor wheel is excited by laser for a long time, the silicone cannot withstand high temperature and is liable to deterioration or burnout, which affects the luminous efficiency and reliability of such phosphor wheel. On the other hand, another manufacturing process for the phosphor wheel is carried out by the means of sintering phosphor in Glass (PIG) or phosphor in ceramic (PIC), but the manufacturing cost is high and unfavorable to industry competition.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a wavelength conversion module with good conversion efficiency and reliability.

The disclosure provides an illumination system with good optical quality and reliability.

The disclosure provides a projection apparatus with good optical quality and reliability.

The disclosure provides a method for forming a wavelength conversion module, which can form a wavelength conversion module with good conversion efficiency and reliability.

The objectives and advantages of the disclosure may be further understood in the technical features disclosed in the disclosure.

To achieve one or a part or all the objectives or other objectives, an embodiment of the present disclosure provides a wavelength conversion module. The wavelength conversion module includes a substrate, a reflective layer, and a wavelength conversion layer. The substrate includes an axis located at the center of the substrate. The reflective layer is located on the substrate, wherein the reflective layer has two first reflective regions and a second reflective region. The second reflective region is located between the two first reflective regions in a radial direction from the axis of the substrate to the edge of the substrate, and the distance from the top of the reflective layer in the second reflective region to the substrate is smaller than the distance from the top of the reflective layer in the first reflective region to the substrate. The wavelength conversion layer is located on the substrate, wherein the reflective layer is located between the substrate and the wavelength conversion layer.

To achieve one or a part or all the objectives or other objectives, an embodiment of the present disclosure provides an illumination system. The illumination system includes the abovementioned wavelength conversion module and an excitation light source. The excitation light source is configured to emit an excitation beam, wherein the excitation beam is transmitted to the wavelength conversion module and converted into an illumination beam through the wavelength conversion module.

To achieve one or a part or all the objectives or other objectives, an embodiment of the present disclosure provides a projection apparatus. The projection apparatus includes the abovementioned illumination system, a light valve, and a projection lens. The light valve is located on the transmitting path of the illumination beam and is configured to convert the illumination beam into an image beam. The projection lens is located on the transmitting path of the image beam and is configured to convert the image beam into a projection beam.

To achieve one or a part or all the objectives or other objectives, an embodiment of the present disclosure provides a method for forming a wavelength conversion module, including the following steps. A substrate is provided, wherein the substrate includes an axis located at the center of the substrate. A reflective layer is formed on the substrate, wherein the reflective layer has two first reflective regions and a second reflective region, wherein the second reflective region is located between the two first reflective regions in a radial direction from an axis of the substrate to an edge of the substrate, and the distance from the top of the reflective layer in the second reflective region to the substrate is smaller than the distance from the top of the reflective layers in each of the first reflective regions to the substrate. A wavelength conversion layer is formed on the substrate, wherein the reflective layer is disposed between the substrate and the wavelength conversion layer.

Based on the above, embodiments of the present disclosure have at least one of the following advantages or effects. In an embodiment of the present disclosure, the wavelength conversion module of the illumination system of the projection apparatus is designed with two first reflective regions and the second reflective region of the reflective layer configured with different heights, such that the wavelength conversion layers of the wavelength conversion module in different regions have different heights, which allows that some regions of the wavelength conversion layer can be prevented from sitting in a place where the energy of the laser spot is concentrated. In this way, the wavelength conversion module can have good conversion efficiency and reliability. Moreover, the illumination system and the projection apparatus using the wavelength conversion module can also prevent the laser spot from being focused on the wavelength conversion layer of the wavelength conversion module through the above configuration, thereby avoiding the risks of deterioration and/or burning caused by the bonding material with low resistance to high temperature, which further allows for good optical quality and reliability. In addition, the method for forming the wavelength conversion module in the embodiment of the present disclosure can also prevent some regions of the wavelength conversion layer from sitting in a place where the energy of the laser spot is concentrated through the configuration that different regions of the reflective layer have different heights, which enables the wavelength conversion module to achieve good reliability and conversion efficiency.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
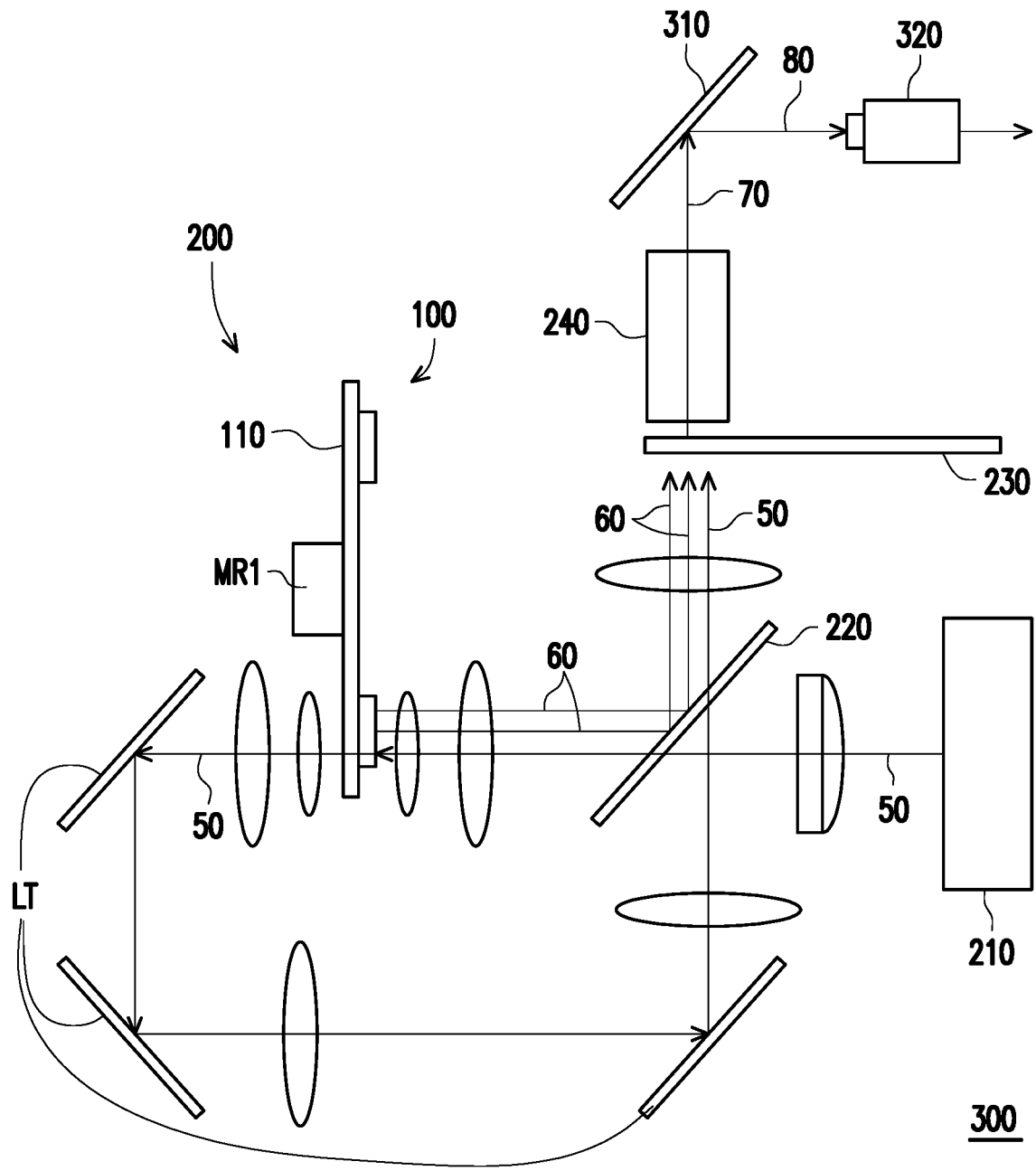
FIG. 1 is a structural schematic diagram of a projection apparatus according to an embodiment of the disclosure.

FIG. 1 is a structural schematic diagram of a projection apparatus according to an embodiment of the disclosure. Referring to FIG. 1, in the embodiment, a projection apparatus 300 includes an illumination system 200, a light valve 310, and a projection lens 320. The illumination system 200 is configured to provide an illumination beam 70. The light valve 310 is located on the transmitting path of the illumination beam 70 and configured to convert the illumination beam 70 into an image beam 80. The projection lens 320 is located on the transmitting path of the image beam 80 and is configured to project the image beam 80 onto a screen or wall (not shown) for imaging. For instance, in the embodiment, the light valve 310 is, for example, a digital micromirror device (DMD) or a liquid-crystal-on-silicon panel (LPOS panel). However, in other embodiments, the light valve 310 can also be a transmissive liquid crystal panel or other beam modulator.

Specifically, as shown in FIG. 1, the illumination system 200 includes an excitation light source 210, a light splitting unit 220, and a wavelength conversion module 100. The excitation light source 210 is configured to emit an excitation beam 50. In this embodiment, the excitation light source 210 is a laser light source, and the excitation light beam 50 is a blue laser beam. For example, the excitation light source 210 may include a plurality of blue laser diodes (not shown) arranged in array, but the disclosure is not limited thereto.

Specifically, as shown in FIG. 1, in the present embodiment, the light splitting unit 220 is disposed on the transmitting path of the excitation light beam 50 and located between the excitation light source 210 and the wavelength conversion module 100. Specifically, the light splitting unit 220 may be a semi-transmissive and semi-reflective component, a dichroic component, a polarization light-splitting component or other various components that can split the light beam. For instance, in the embodiment, the light splitting unit 220 can, for example, allow the blue beam to penetrate, and provide reflective function for the light beams of other colors (such as red, green, yellow, etc.). That is to say, the light splitting unit 220 can allow the blue excitation beam 50 to pass through, so that the excitation beam 50 can pass through the light splitting unit 220 and be transmitted to be incident into the wavelength conversion module 100, and converted into the illumination beam 70 through the wavelength conversion module 100.

Further explanation is incorporated below with reference to FIG. 2A to FIG. 2E.

Figure 2A:
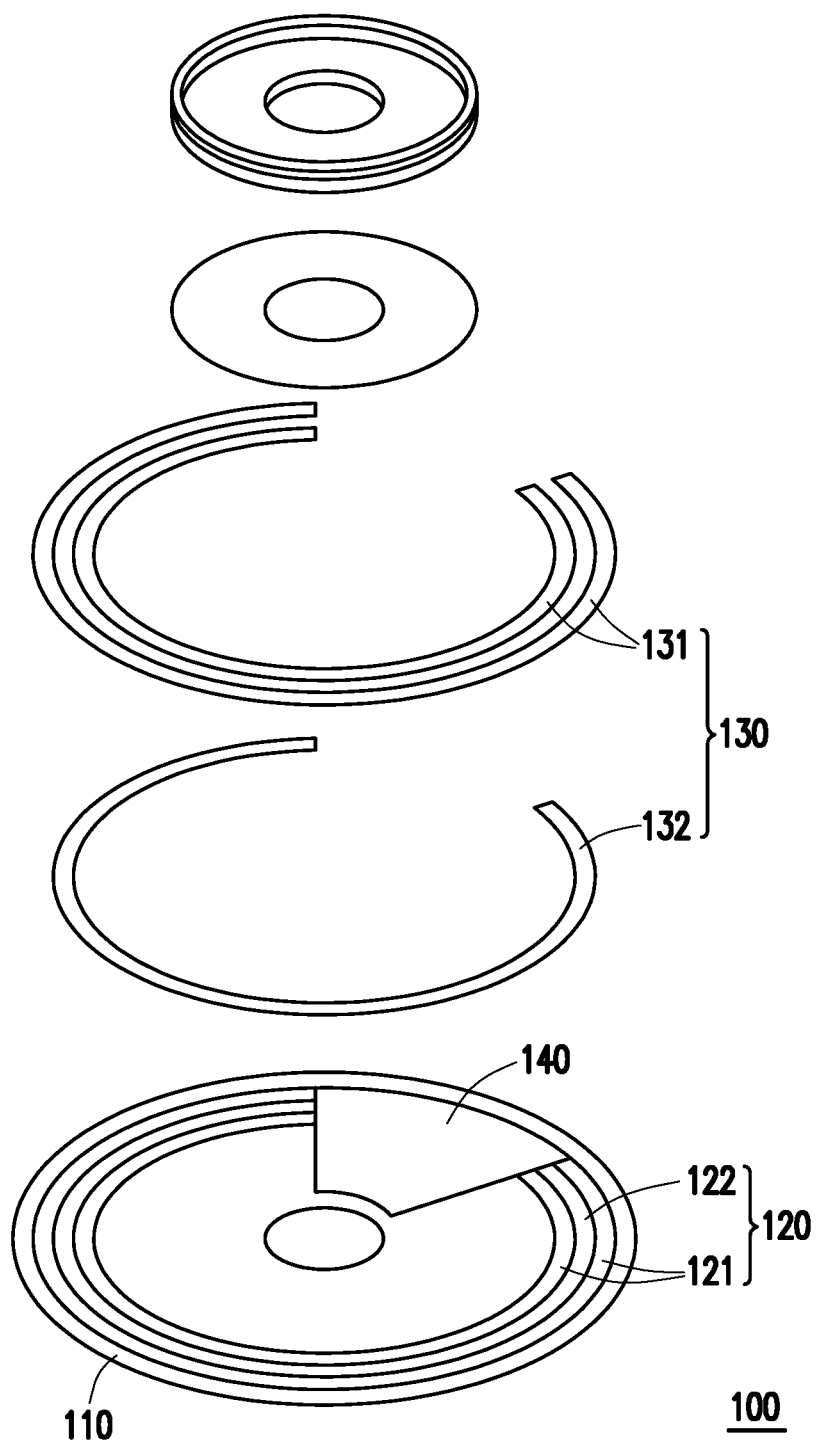
FIG. 2A is an exploded view of a wavelength conversion module of FIG. 1.
Figure 2B:
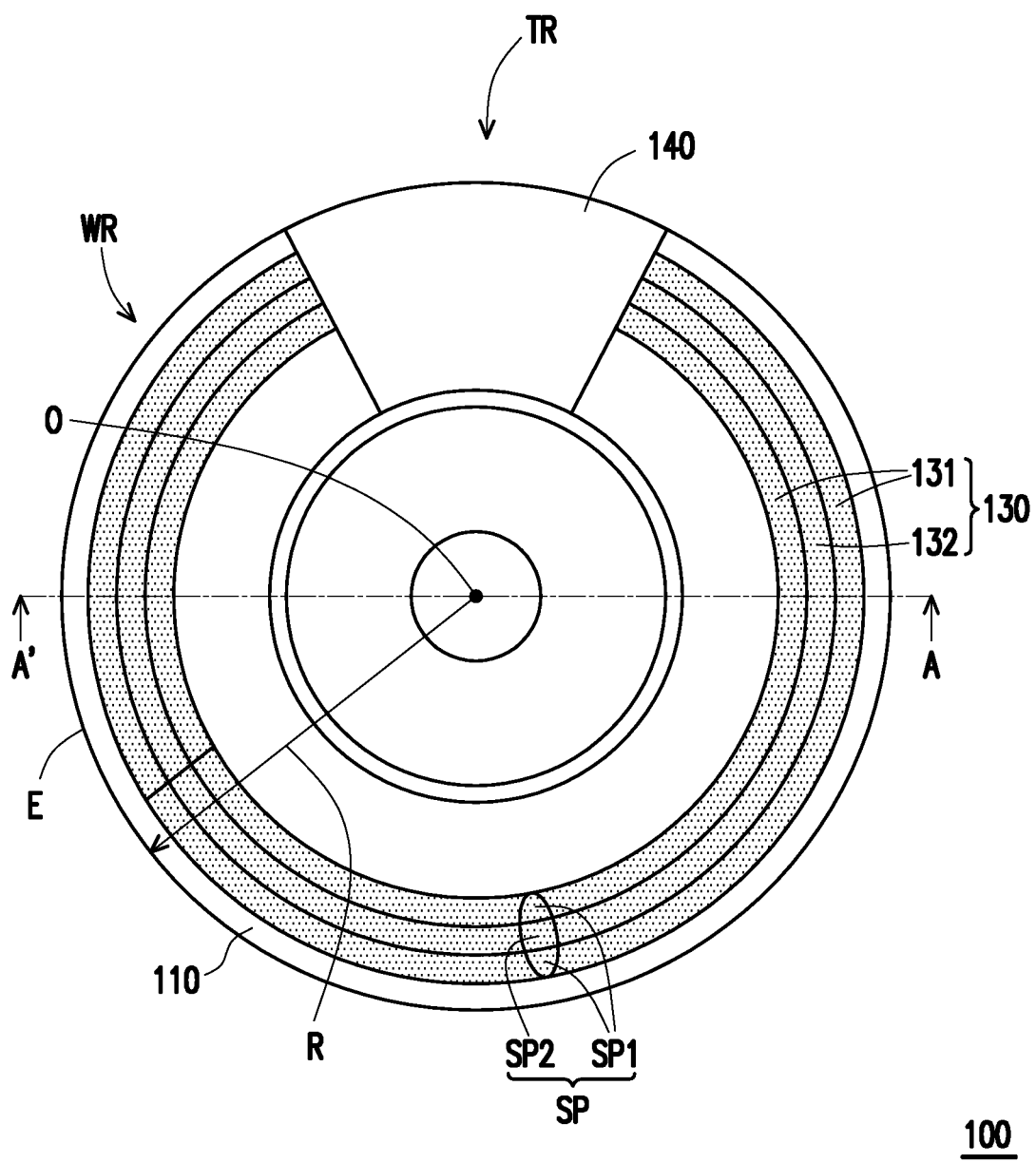
FIG. 2B is a top view showing an excitation beam incident into the wavelength conversion module of FIG. 2A.
Figure 2C:
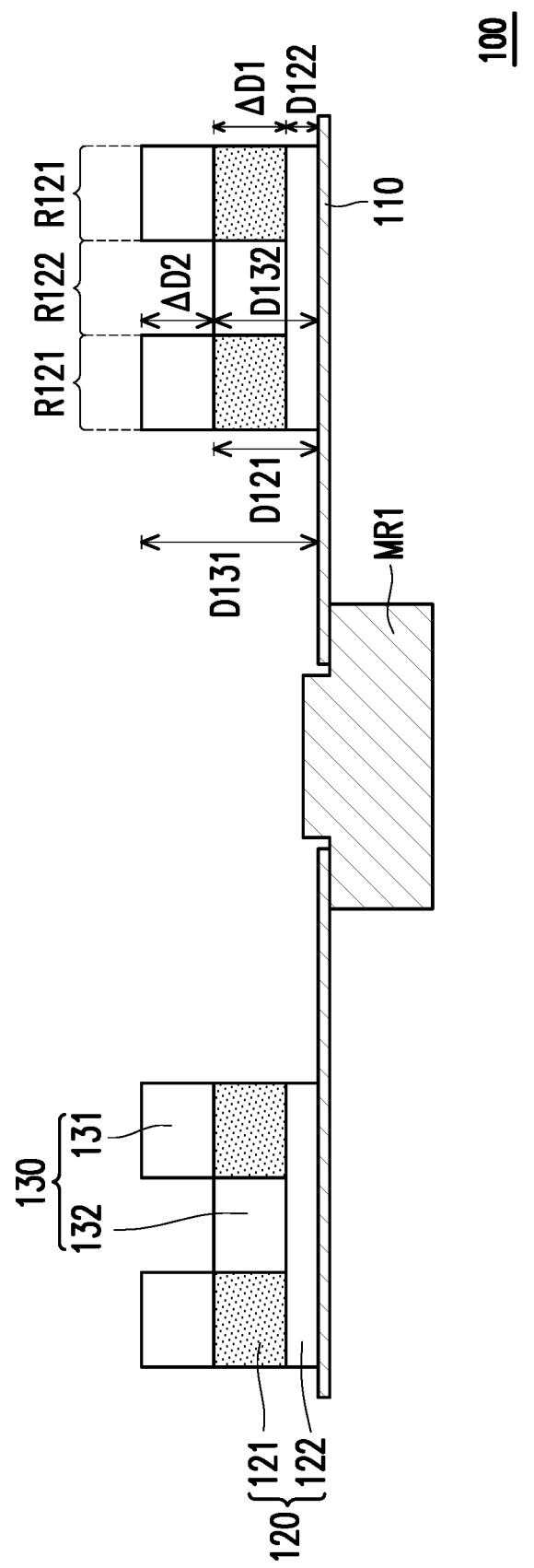
FIG. 2C is a cross-sectional view of the wavelength conversion module of FIG. 2A taken along line A-A'.
Figure 2D:
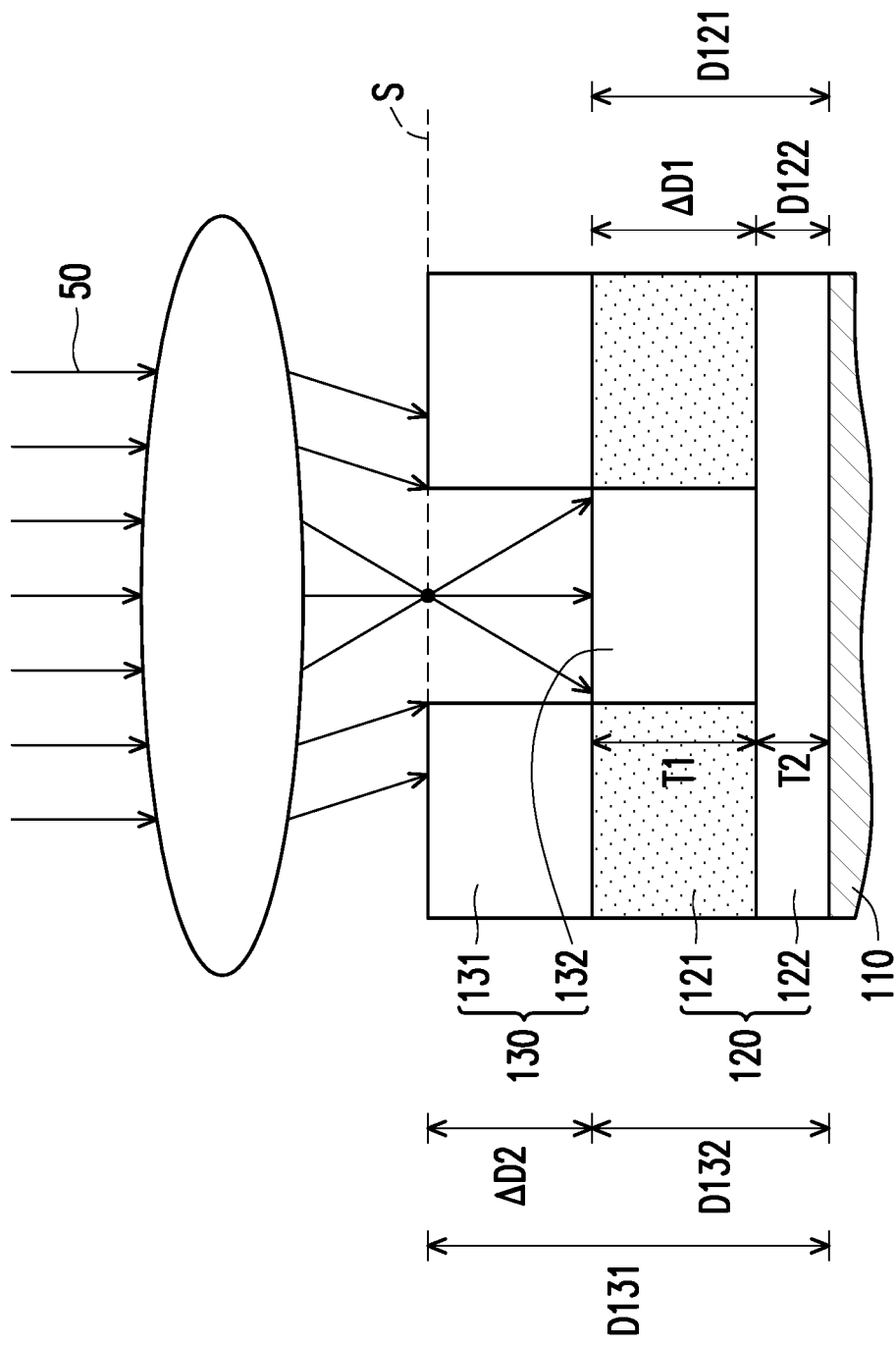
FIG. 2D is an optical path schematic diagram showing an excitation beam incident into the wavelength conversion module of FIG. 2C.
Figure 2E:
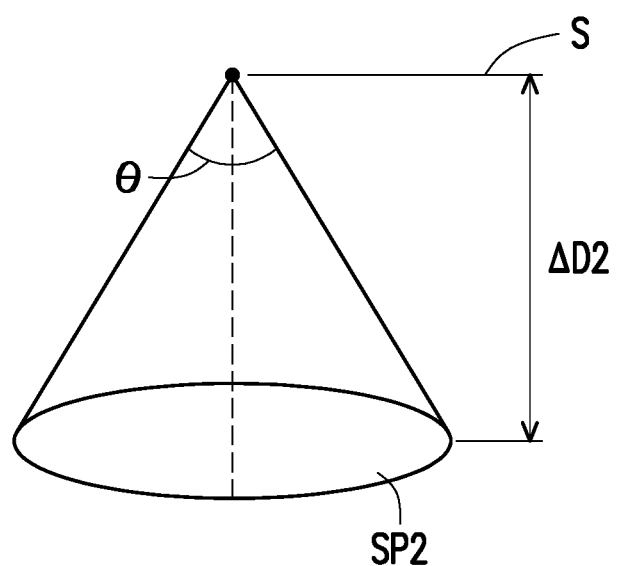
FIG. 2E is a schematic view showing a light spot formed by an excitation beam on a second reflective region of the wavelength conversion module of FIG. 2A.

FIG. 2A is an exploded view of a wavelength conversion module of FIG. 1. FIG. 2B is a top view showing an excitation beam incident into the wavelength conversion module of FIG. 2A. FIG. 2C is a cross-sectional view of the wavelength conversion module of FIG. 2A taken along line A-A'. FIG. 2D is an optical path schematic diagram showing an excitation beam incident into the wavelength conversion module of FIG. 2C. FIG. 2E is a schematic view showing a light spot formed by an excitation beam on a second reflective region of the wavelength conversion module of FIG. 2A. Specifically, as shown in FIG. 1, in the embodiment, the wavelength conversion module 100 is located on the transmitting path of the excitation beam 50, and as shown in FIG. 2A, the wavelength conversion module 100 includes at least one wavelength conversion region WR and a light pass-through region TR corresponding to a diffusion sheet 140. For example, as shown in FIG. 1 to FIG. 2B, at least one wavelength conversion region WR of the wavelength conversion module 100 is configured to convert the excitation beam 50 into at least one wavelength conversion beam 60, and the light pass-through region TR of the wavelength conversion module 100 is configured to allow the excitation beam 50 to pass through and be transmitted to the subsequent optical component.

More specifically, as shown in FIG. 2A and FIG. 2B, in the embodiment, the wavelength conversion module 100 includes a substrate 110, a reflective layer 120, and a wavelength conversion layer 130. As shown in FIG. 2A and FIG. 2B, the reflective layer 120 and the wavelength conversion layer 130 are located on the substrate 110, and the reflective layer 120 is located between the substrate 110 and the wavelength conversion layer 130, and the wavelength conversion layer 130 corresponds to at least one wavelength conversion region WR. For example, in the embodiment, the material of the substrate 110 may be a metal plate or a heat-dissipation substrate having a high thermal conductivity. The substrate 110 may be made of aluminum, aluminum alloy, copper, copper alloy, aluminum nitride or silicon carbide. However, the disclosure is not limited thereto.

Further, as shown in FIG. 2C, in the embodiment, the reflective layer 120 has two first reflective regions R121 and a second reflective region R122. The substrate 110 includes an axis O, the axis O is located at the center of the substrate 110, and the second reflective region R122 is located between the two first reflective regions R121 in a radial direction R from the axis O of the substrate 110 to the edge E of the substrate 110. Moreover, as shown in FIG. 2C, the distance D122 from the top of the reflective layer 120 in the second reflective region R122 to the substrate 110 is smaller than the distance D121 from the top of the reflective layers 120 in each of the first reflective regions R121 to the substrate 110.

Further, as shown in FIG. 2C, in the embodiment, the reflective layer 120 includes two first reflective layers 121 and a second reflective layer 122. For example, in this embodiment, the first reflective layer 121 is a diffuse reflective layer, and the second reflective layer 122 is a high-reflective layer. The diffuse reflective layer can be formed by coating, printing, spraying, etc. on the surface of the substrate 110 or of the high-reflective layer. For example, in this embodiment, the diffuse reflective layer may be a reflective layer in which white scattering particles and a bonding material are mixed, and the material of the white scattering particles may be titanium dioxide ($TiO_2$), silicon dioxide ($SiO_2$), aluminum oxide ($Al_2O_3$), boron nitride (BN), zirconium dioxide ($ZrO_2$), the material of the bonding material may be silicon, but the disclosure is not limited thereto. The high-reflective layer (or specular reflective layer) may be formed by sputtering, vapor deposition, or the like on the surface of the substrate 110, and the high-reflective layer may be provided with a protecting layer or a metal layer of a dielectric layer. For example, in this embodiment, the material of the high-reflective layer may be silver, silver alloy, aluminum, aluminum alloy, gold, gold alloy, dielectric or metal film plus dielectric, etc., but the disclosure is not limited thereto.

Specifically, as shown in FIG. 2C, in the embodiment, the two first reflective layers 121 are correspondingly disposed on the two first reflective regions R121, and the second reflective layer 122 is correspondingly disposed on the two first reflective regions R121 and second reflective region R122. Also, as shown in FIG. 2B, in the two first reflective regions R121, the two first reflective layers 121 cover on the second reflective layer 122, wherein the first reflective layer 121 has a thickness T1 and the second reflective layer 122 has a thickness T2. For example, in the present embodiment, the thickness T1 may range from 0.03 mm to 0.50 mm.

Thus, as shown in FIG. 2C, since the reflective layer 120 in the first reflective region R121 has the first reflective layer 121 and the second reflective layer 122 stacked on each other, the thickness of the reflective layer 120 located in the first reflective region R121 is the sum of the thickness T1 of the first reflective layer 121 and the thickness T2 of the second reflective layer 122. Meanwhile, the reflective layer 120 in the second reflective region R122 has the second reflective layer 122, so the thickness of the reflective layer 120 located in the second reflective region R122 is the thickness T2 of the second reflective layer 122. As such, there is a distance difference ΔD1 between the distance D122 from the top of the reflective layer 120 in the second reflective region R122 to the substrate 110 and the distance D121 from the top of the reflective layer 120 in each of the first reflective regions R121 to the substrate 110. Specifically, in the present embodiment, the distance difference ΔD1 is a range of the thickness T1 of the first reflective layer 121, and therefore, the range of the distance difference ΔD1 is also between 0.03 mm and 0.50 mm.

On the other hand, as shown in FIG. 2D, in the embodiment, the wavelength conversion layer 130 includes two first wavelength conversion layers 131 and a second wavelength conversion layer 132, and the two first wavelength conversion layers 131 are correspondingly disposed on the two first reflective regions R121 of the reflective layer 120, and the second wavelength conversion layer 132 is correspondingly disposed on the second reflective region R122 of the reflective layer 120. Thus, as shown in FIG. 2C, the tops of the two first wavelength conversion layers 131 of the wavelength conversion layer 130 are aligned with the reference plane S, and the distance D132 from the top of the second wavelength conversion layer 132 to the substrate 110 is lower than the reference plane S, and thus forming a distance difference ΔD2 with the distance D131 from the top of each of the first wavelength conversion layers 131 to the substrate 110. This distance difference ΔD2 is also the range of the thickness T1 of the first reflective layer 121, and therefore, the range of the distance difference ΔD2 is also between 0.03 mm and 0.50 mm.

In addition, in the embodiment, the wavelength conversion module 100 may further selectively include an anti-reflective layer (not shown), wherein the anti-reflective layer may be located on the first wavelength conversion layer 131 and the second wavelength conversion layer 132 of the wavelength conversion layer 130. In this embodiment, the anti-reflective layer is, for example, an anti-reflective coating (AR Coating) and is coated on the wavelength conversion layer 130. In this way, the reflective ratio of the incident excitation beam 50 can be reduced, and the excitation beam 50 incident at different angles can effectively enter the wavelength conversion layer 130, thereby improving the conversion efficiency.

For example, in the embodiment, each of the first wavelength conversion layer 131 and the second wavelength conversion layer 132 of the wavelength conversion layer 130 include a wavelength conversion material and a bonding material. For example, in this embodiment, the wavelength converting material may be phosphor powder that can generate red light, phosphor powder that can generate yellow light, or phosphor powder that can generate green light, and phosphor powder of generating correspondingly needed color light can be correspondingly selected according to the requirement of different wavelength conversion optical regions WR. On the other hand, the material of the bonding material may be silicon, and may be used for the wavelength conversion material to be scattered therein, and is applied on the reflective layer 120 to be cured to form the wavelength conversion layer 130. Moreover, in the present embodiment, since the silicon as the bonding material of the wavelength conversion layer 130 has a good adhesion effect on the reflective layer 120, it is not required to additionally provide an adhesive layer, but the present disclosure is not limited thereto. In an embodiment, the first wavelength conversion layer 131 and the second wavelength conversion layer 132 may be phosphor sheets and attached to the reflective layer 120 through an adhesive layer.

In another embodiment that is not shown, the bonding material of the first wavelength conversion layer 131 and the second wavelength conversion layer 132 of the wavelength conversion layer 130 may also be selected from an inorganic adhesive material such as ceramic or silicon dioxide, and is formed by being mixed and sintered with the wavelength conversion material. In other words, the first wavelength conversion layers 131 and the second wavelength conversion layer 132 of the wavelength conversion layer 130 may also be formed through phosphor in glass (PIG) process or phosphor in ceramic (PIC) process. On this case, the wavelength conversion module 100 may include an adhesive layer, and at least a portion of the adhesive layer may be located between the wavelength conversion layer 130 and the reflective layer 120. Specifically, since at least a portion of the adhesive layer is located between the second wavelength conversion layer 132 and the high-reflective layer of the second reflective layer 122, it is possible to make the second wavelength conversion layer 132 to be attached to the second reflective layer 122. On the other hand, since the diffuse reflective layer of the first reflective layer 121 includes a bonding material having a good adhesion effect, and can also be used to make the first wavelength conversion layers 131 to be attached to the first reflective layer 121, the adhesive layer may be or may not be provided between the first wavelength conversion layers 131 and the first reflective layer 121.

Next, referring to FIG. 1, in the present embodiment, when the excitation beam 50 is transmitted to the wavelength conversion module 100, the excitation beam 50 is focused on the reference plane S. Referring to FIG. 2B, the excitation beam 50 forms a light spot SP on the wavelength conversion module 100. The two first portions SP1 of the light spot SP are respectively located on the two first wavelength conversion layers 131, and the second portion SP2 of the light spot SP is located on the second wavelength conversion layer 132, and the focus point of excitation beam 50 is above the second portion SP2 of the light spot SP.

For example, referring to FIG. 2D and FIG. 2E, in the present embodiment, it is assumed that the peak power of the excitation beam 50 at the focus point is 100 watts, and the area of the focus point is 0.1 square millimeter, and the divergence angle θ is about 30 degrees. The energy density of the excitation beam 50 in this range is approximately 1000 watts per square millimeter. In the present embodiment, the distance difference ΔD2 is at least 0.03 mm, and when the distance difference ΔD2 is about 0.03 mm, the area of the second portion SP2 of the light spot SP is expanded from 0.1 $mm^2$ to 0.116 $mm^2$, and the energy density of the light spot SP in this range will be reduced to approximately 862 watts per square millimeter, which is approximately 86.2% of the energy density of focus point. If the distance difference ΔD2 is increased to about 0.50 mm, the area of the second portion SP2 of the light spot SP is expanded to 0.368 $mm^2$, and the energy density of the light spot SP in this range will be reduced to about 272 watts per square millimeter and is about 27.2% of the energy density of focus point. The divergence angle θ can be adjusted by adjusting the lens shape and so on, by adjusting the lens shape and the distance difference ΔD2, the variation of energy density can have a broader adapting range. For the detailed value of variation in energy density, refer to the following Table 1. It should be noted that the numerical ranges herein are for illustrative purposes only and are not intended to limit the present disclosure.

TABLE 1

Distance difference ΔD2 and variation of energy density

| power (watt) | Area of Focus point (square millimeter) | θ divergence angle (degree) | distance difference ΔD2 (mm) | Area away from focus point (square millimeter) | energy density (watt/square millimeter) | energy density variation percentage (%) |
|---|---|---|---|---|---|---|
| 100 | 0.1 | 30 | 0.00 | 0.100 | 1000 | 100% |
|  |  |  | 0.03 | 0.116 | 861 | 86% |
|  |  |  | 0.05 | 0.127 | 789 | 79% |
|  |  |  | 0.10 | 0.154 | 651 | 65% |
|  |  |  | 0.30 | 0.261 | 383 | 38% |
|  |  |  | 0.50 | 0.368 | 272 | 27% |

As such, the region of the second wavelength conversion layer 132 of the wavelength conversion layer 130 can be prevented from being directly irradiated on the place where the energy of the laser spot is concentrated (the focus point of the laser spot SP), while avoiding the risks of deterioration and/or burning caused by the bonding material with low resistance to high temperature in the second wavelength conversion layer 132 of the wavelength conversion layer 130, which in turn allows for good conversion efficiency and reliability. For example, in the embodiment, the ratio of the width of the second reflective region R122 to the width of the reflective layer 120 ranges from 20% to 50%, and thus the ratio of the width of the second wavelength conversion layer 132 to the width of the wavelength conversion layer 130 is also between 20% and 50%. As such, not only that the wavelength conversion layer 130 can improve the reliability through the arrangement of the second wavelength conversion layer 132, and through the configuration that the width of the first wavelength conversion layer 131 still accounts for a majority portion of the width of the wavelength conversion layer 130, it is also possible to ensure that there is sufficient excitation beam 50 incident into the wavelength conversion layer 130, thus maintaining good conversion efficiency.

In this way, through the configuration of the wavelength conversion module 100 in the illumination system 200 and the projection apparatus 300, the laser spot SP is not focused on the wavelength conversion layer 130 of the wavelength conversion module 100, thereby avoiding the risks of deterioration and/or burning caused by the bonding material with low resistance to high temperature, which in turn allows for good optical quality and reliability.

On the other hand, as shown in FIG. 2A to FIG. 2B, in the embodiment, the substrate 110 of the wavelength conversion module 100 has a hollow region (not labeled), which is disposed corresponding to the region of the light pass-through region TR, and the wavelength conversion module 100 further includes a diffusion sheet 140, and the substrate 110 in the light pass-through region TR may be in configured in a hollow form. That is, in the present embodiment, the wavelength conversion module 100 is the transmissive wavelength conversion module 100, and the light pass-through region TR is configured to allow the excitation beam 50 to penetrate.

Referring to FIG. 1 and FIG. 2A to FIG. 2C again, in the embodiment, the wavelength conversion module 100 further includes a first driving device MR1 for rotating the wavelength conversion module 100, such that the light pass-through region TR and at least one wavelength conversion region WR enter the irradiating range of the excitation beam 50 at different times, thereby selectively allowing the excitation beam 50 to pass through or to be converted into at least one wavelength conversion beam 60. Referring to FIG. 1, in the embodiment, when the light pass-through region TR of the wavelength conversion module 100 enters the irradiating range of the excitation beam 50, the excitation beam 50 passes through the wavelength conversion module 100 and is transmitted to a filter module 230 through a light transmitting module LT. On the other hand, in the present embodiment, when the wavelength conversion region WR enters the irradiating range of the excitation beam 50, the excitation beam 50 is converted into the wavelength conversion beam 60 through the wavelength conversion region WR. Thereafter, as shown in FIG. 1, the wavelength conversion beam 60 from the wavelength conversion module 100 can be guided to the light splitting unit 220 and reflected to the subsequent filter module 230. In an embodiment, the wavelength conversion module 100 can further divide the wavelength conversion region WR into a plurality of regions according to different needs, and correspondingly selects the needed phosphor powder in each region to achieve the purpose of generating a plurality of conversion beams.

Specifically, as shown in FIG. 1, the projection apparatus 300 may further include the above-mentioned filter module 230. The filter module 230 is located on the transmitting path of the excitation beam 50 and the wavelength conversion beam 60, and is further provided with a filter region (not shown) and a light transmissible region (not shown). The filter module 230 further includes a second driving device (not shown) for making the filter region (not shown) to enter the irradiating range of the wavelength conversion beam 60 correspondingly at different times, for example, to form red color light and green color light respectively through filtering. On the other hand, the light transmissible region (not shown) also correspondingly enters the irradiating range of the excitation beam 50 transmitted to the filter module 230 at different times to allow the excitation beam 50 to pass through. In this way, the excitation beam 50 and the wavelength conversion beam 60 can be converted into an illumination beam 70 having a plurality of different colors in timing sequence.

On the other hand, as shown in FIG. 1, in the present embodiment, the projection apparatus 300 further includes a light homogenizing element 240 located on the transmitting path of the excitation beam 50 and the wavelength conversion beam 60. In the present embodiment, the light homogenizing element 240 includes an integration rod, but the present disclosure is not limited thereto. In more detail, as shown in FIG. 1, when the illumination beam 70 is transmitted to the light homogenizing element 240 through the illumination system 200, the excitation beam 50 and the wavelength conversion beam 60 can be uniformed by the light homogenizing element 240 and the illumination beam 70 can be transmitted to the light valve 310.

Next, as shown in FIG. 1, the light valve 310 is located on the transmitting path of the illumination beam 70 and is configured to convert the illumination beam 70 into an image beam 80. The projection lens 320 is located on the transmitting path of the image beam 80 and is configured to project the image beam 80 onto a screen or wall (not shown) to form an image picture. After the illumination beam 70 is concentrated on the light valve 310, the light valve 310 sequentially converts the illumination beam 70 into the image beam 80 and transmits the image beam 80 to the projection lens 320. Therefore, the image projected by the image beam 80 converted by the light valve 310 is an image picture.

Figure 3:
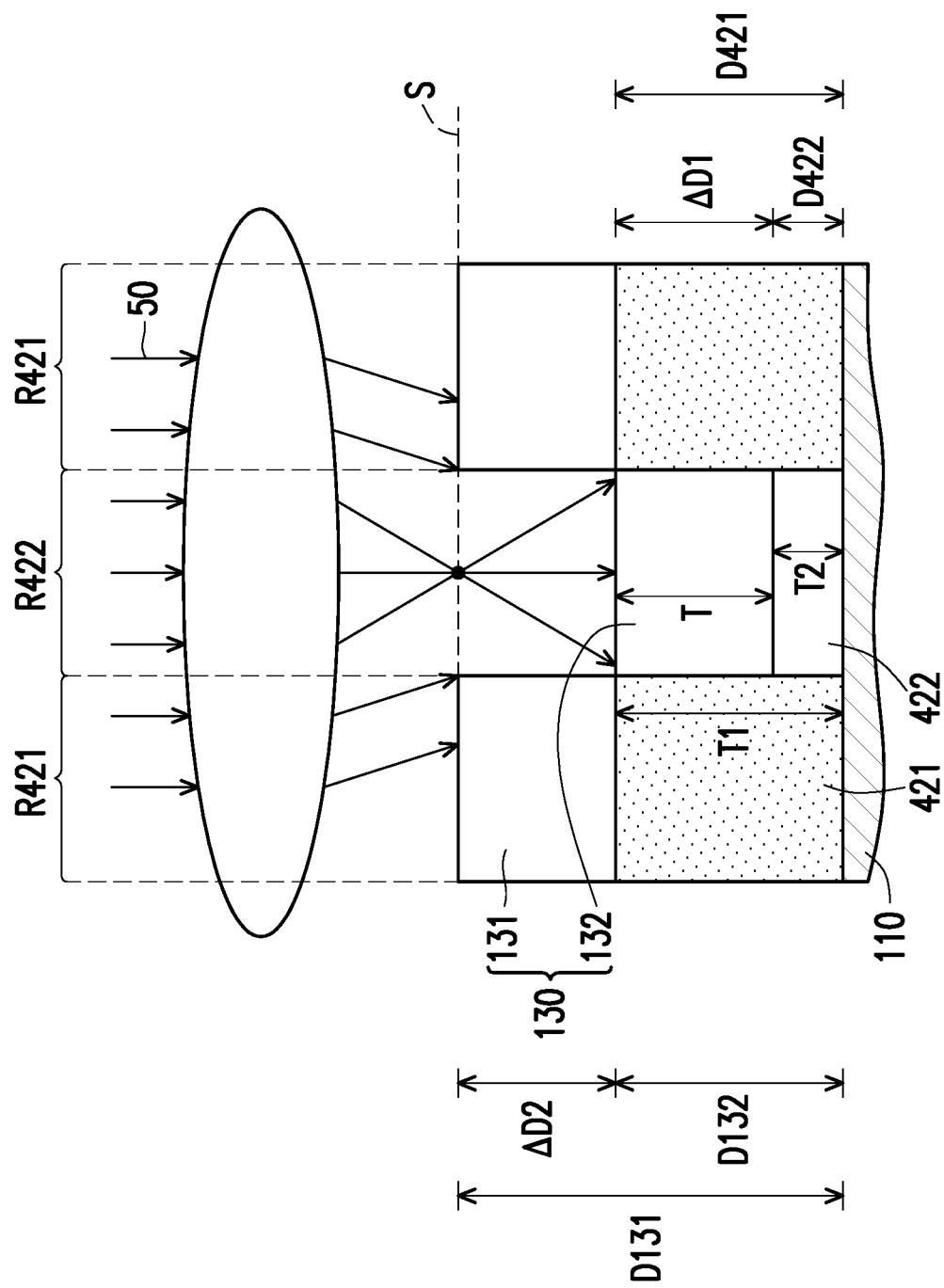
FIG. 3 is an optical path schematic diagram showing an excitation beam incident into another wavelength conversion module.

FIG. 3 is an optical path schematic diagram showing an excitation beam incident into another wavelength conversion module. Referring to FIG. 3, a wavelength conversion module 400 of FIG. 3 is similar to the wavelength conversion module 100 of FIG. 2A to FIG. 2B, and the differences are as follows. Specifically, as shown in FIG. 3, in the embodiment, the two first reflective layers 421 of the reflective layer 420 are correspondingly disposed on the two first reflective regions R421. The second reflective layer 422 is correspondingly disposed on the second reflective region R422. For example, in this embodiment, each of the first reflective layers 421 is a diffuse reflective layer, and the second reflective layer 422 is selectively a high-reflective layer or a diffuse reflective layer, the present disclosure is not limited thereto, as long as there is a thickness difference T between the thickness T2 of the second reflective layer 422 and the thickness T1 of each of the first reflective layers 421.

More specifically, as shown in FIG. 3, in the embodiment, the thickness T2 of the second reflective layer 422 is smaller than the thickness T1 of each of the first reflective layers 421. For example, in the embodiment, the thickness difference T between the second reflective layer 422 and each of the first reflective layers 421 ranges from 0.03 mm to 0.50 mm. As such, in the present embodiment, the distance difference ΔD1 between the distance D422 from the top of the reflective layer 420 in the second reflective region R422 to the substrate 110 and the distance D421 from the top of the reflective layer 420 in each of the first reflective regions R421 to the substrate 110 is a range of the thickness difference T between the second reflective layer 422 and each of the first reflective layers 421, and therefore, the range of the distance difference ΔD1 is also between 0.03 mm and 0.50 mm. As such, the distance difference ΔD2 between the distance D132 from the top of the second wavelength conversion layer 132 to the substrate 110 and the distance D131 from the top of each of the first wavelength conversion layers 131 to the substrate 110 may also be in the range of 0.03 mm to 0.50 mm.

In this way, the region of the second wavelength conversion layer 132 of the wavelength conversion layer 130 can be prevented from being directly irradiated on the place where the energy of the laser spot is concentrated (the focus point of the laser spot SP), thereby avoiding the risks of deterioration and/or burning caused by the bonding material with low resistance to high temperature in the second wavelength conversion layer 132 of the wavelength conversion layer 130, which in turn allows for good conversion efficiency and reliability.

As such, since the wavelength conversion module 400 of FIG. 3 is similar to the wavelength conversion module 100 of FIG. 2B, the same function can be achieved, and thus the wavelength conversion module 400 can achieve similar effects and advantages as the wavelength conversion module 100 described above, no further descriptions are incorporated herein. Moreover, when the wavelength conversion module 400 is applied to the foregoing projection apparatus 300, the projection apparatus 300 can also achieve similar effects and advantages, and further descriptions are not incorporated herein.

Figure 4A:
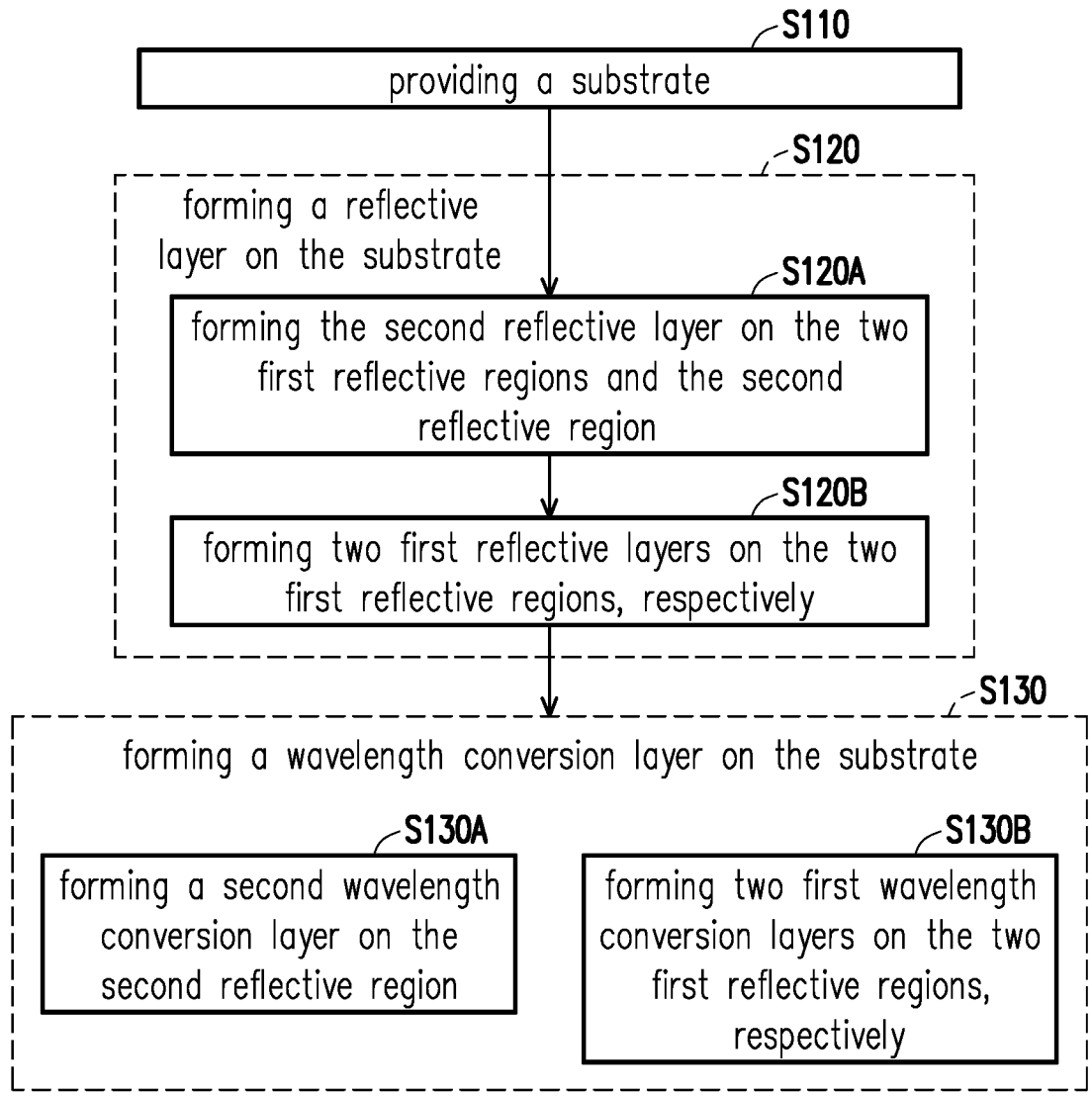
FIG. 4A is a flowchart of a method of forming a wavelength conversion module according to an embodiment of the present disclosure.

FIG. 4A is a flowchart of a method of forming a wavelength conversion module according to an embodiment of the present disclosure. Referring to FIG. 4A, first, step S110 is performed to provide a substrate 110, wherein the substrate 110 includes an axis O, and the axis O is located at the center of the substrate 110. Step S120 is performed to form a reflective layer 120 on the substrate 110, wherein the reflective layer 120 has two first reflective regions R121 and a second reflective region R122, wherein the second reflective region R122 is located between the two first reflective regions R121 in the radial direction R from the axis O of the substrate 110 to the edge E of the substrate 110, and the distance D122 from the top of the reflective layer 120 in the second reflective region R122 to the substrate 110 is smaller than the distance D121 from the top of the reflective layer 120 in each of the first reflective regions R121 to the substrate 110. For example, in the present embodiment, the method of forming the reflective layer 120 includes the following sub-step S120A and sub-step S120B. First, the sub-step S120A is performed to form the second reflective layer 122 on the two first reflective regions R121 and the second reflective region R122. Next, the sub-step S120B is performed, two first reflective layers 121 are respectively formed on the two first reflective regions R121, wherein in the two first reflective regions R121, the two first reflective layers 121 cover the second reflective layer 122. The above steps may be performed through coating, printing, spraying or vapor deposition, sputtering, etc., so that the first reflective layers 121 and the second reflective layer 122 are formed on the substrate 110 or the high-reflective layer. Steps such as baking and grinding may be added between steps depending on the needs.

Next, as shown in FIG. 4A, step S130 is performed to form a wavelength conversion layer 130 on the substrate 110, wherein the reflective layer 120 is located between the substrate 110 and the wavelength conversion layer 130. For example, in the present embodiment, the method of forming the wavelength conversion layer 130 includes the following sub-step S130A and sub-step S130B. The sub-step S130A is to form a second wavelength conversion layer 132 on the second reflective region R122, and the sub-step S130B is to form two first wavelength conversion layers 131 on the two first reflective regions R121, respectively. It should be noted that the present disclosure provides no limitation to the order of performing the sub-step S130A and the sub-step S130B, and the sub-step S130A may be performed before the sub-step S130B, or the sub-step S130B may be performed before the sub-step S130A. The above steps may be performed through attaching, coating, firing, etc., so that the first wavelength conversion layer 131 and the second wavelength conversion layer 132 are formed on the reflective layer 120, and steps such as baking and grinding may be added between steps depending on the needs.

Thus, the structure of the wavelength conversion module 100 as shown in FIG. 2C can be formed, wherein the tops of the two first wavelength conversion layers 131 are aligned with the reference plane S, and there is a distance difference ΔD2 between the distance D132 from the top of the second wavelength conversion layer 132 to the substrate 110 and the distance D131 from the top of each of the first wavelength conversion layers 131 to the substrate 110, and the range of the distance difference ΔD2 is between 0.03 mm and 0.50 mm.

Figure 4B:
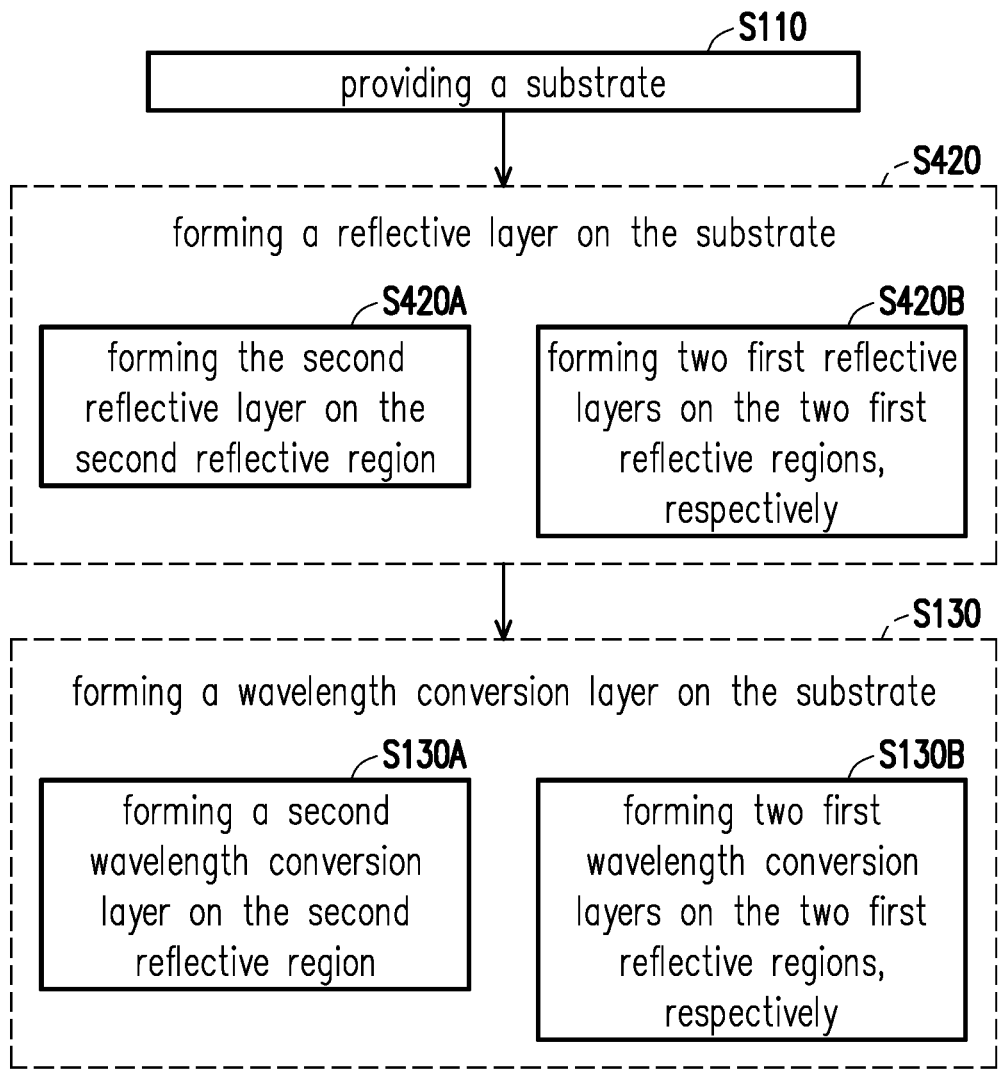
FIG. 4B is a flowchart of a method of forming another wavelength conversion module according to an embodiment of the present disclosure.

FIG. 4B is a flowchart of a method of forming another wavelength conversion module according to an embodiment of the present disclosure. The manufacturing process of the wavelength conversion module of FIG. 4B is similar to the manufacturing process of the wavelength conversion module of FIG. 4A, and can be used to form the wavelength conversion module 400 of FIG. 3, and the differences between the two are as follows. As shown in FIG. 4B, in the present embodiment, the step S420 of forming the reflective layer 420 includes the following sub-step S420A and sub-step S420B. The sub-step S420A is to form a second reflective layer 422 on the second reflective region R422, and the sub-step S420B is to form two first reflective layers 421 on the two first reflective regions R421, respectively, wherein the thickness T2 of the second reflective layer 422 is smaller than the thickness T1 of each of the first reflective layers 421. It should be noted that the present disclosure provides no limitation to the order of performing the sub-step S420A and the sub-step S420B, and the sub-step S420A may be performed before the sub-step S420B, or the sub-step S420B may be performed before the sub-step S420A. The related operation details of step S110 and step S130 shown in FIG. 4B are the same as those in FIG. 4A, and no further details are not described herein. Thus, the steps S110, S420 and S130 shown in FIG. 4B are performed, thereby forming the structure of the wavelength conversion module 400 as shown in FIG. 3.

On the other hand, in the embodiment of FIG. 1, although the projection apparatus 300 is exemplified by including the transmissive wavelength conversion module 100, the present disclosure is not limited thereto. In other embodiments, the projection apparatus 300 can also adopt a reflective wavelength conversion module. Any one of ordinary skill in the art can make appropriate modification to the optical path after referring to the present disclosure to achieve the similar effects and advantages of the foregoing projection apparatus, which still falls within the scope of the present disclosure. Some examples will be described below as an explanation.

Figure 5A:
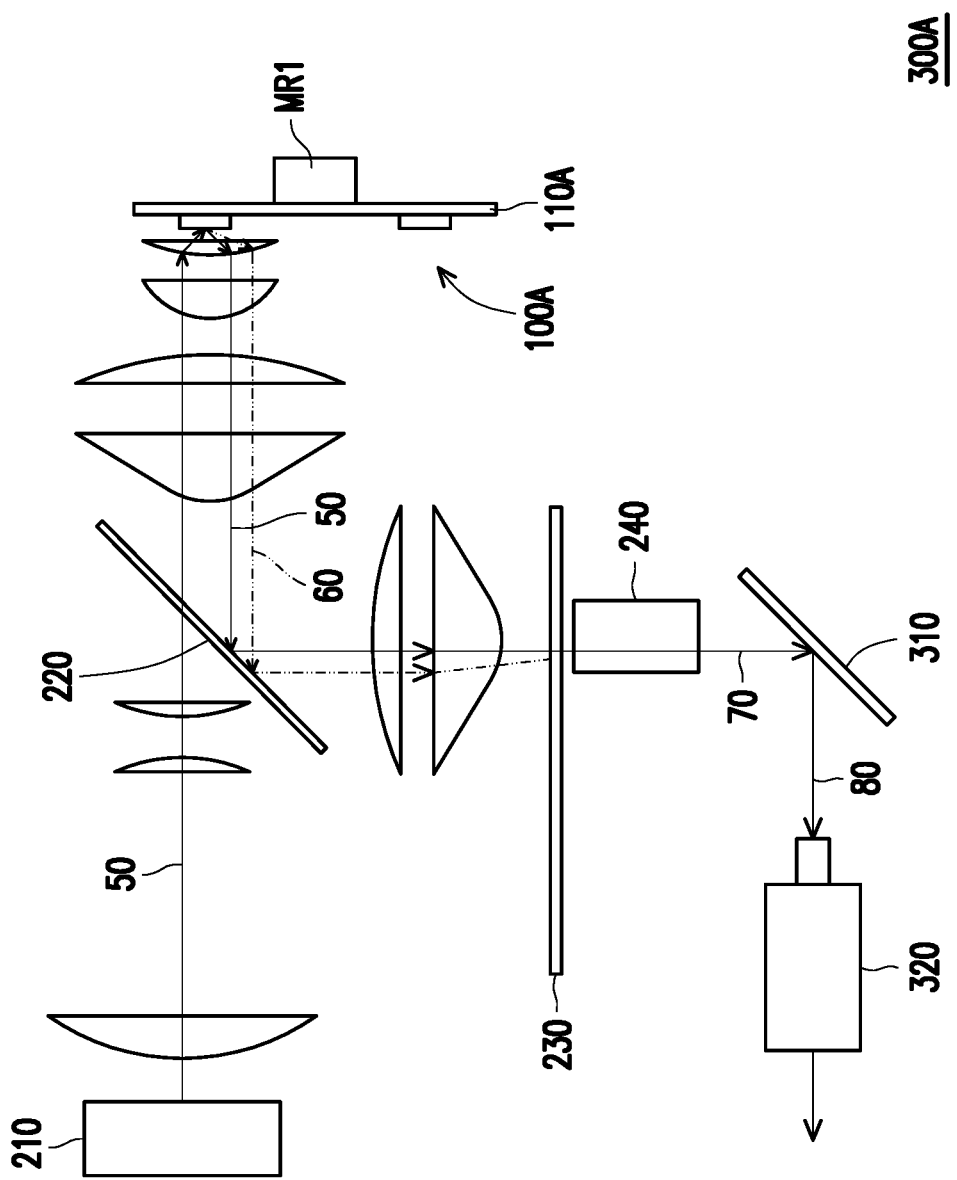
FIG. 5A is a structural schematic diagram of another projection apparatus according to an embodiment of the present disclosure.
Figure 5B:
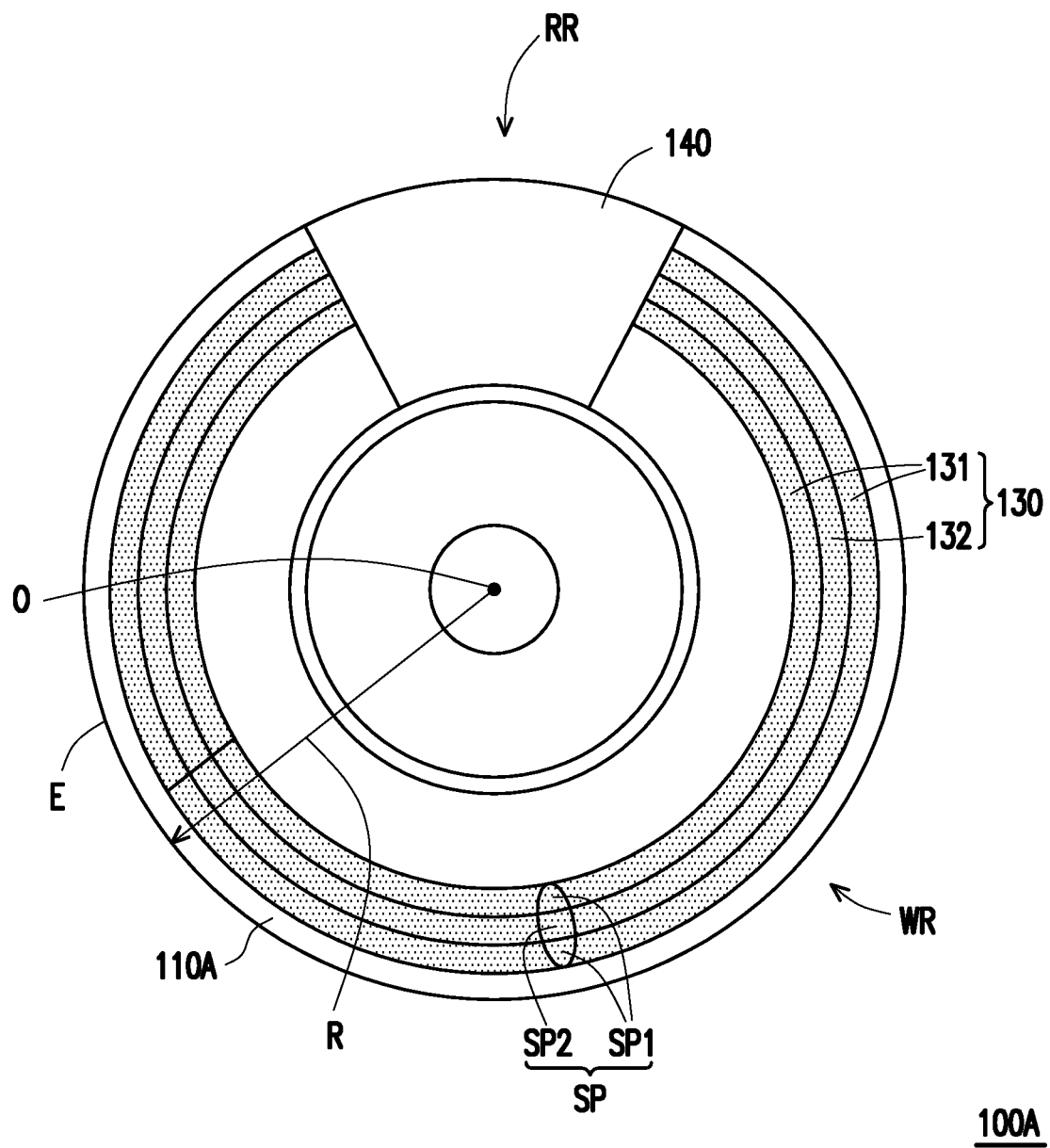
FIG. 5B is a top view of another wavelength conversion module of FIG. 5A.

FIG. 5A is a structural schematic diagram of another projection apparatus according to an embodiment of the present disclosure. FIG. 5B is a top view of another wavelength conversion module of FIG. 5A. As shown in FIG. 5A and FIG. 5B, in the embodiment, the projection apparatus 300A adopts the wavelength conversion module 100A of FIG. 5B, and the wavelength conversion module 100A is similar to the wavelength conversion modules 100 and 400, and the only difference lies in that the wavelength conversion module 100A is a reflective wavelength conversion module. Therefore, the substrate 110 of the wavelength conversion module 100A does not have a hollow region, but is a substrate 110A having a complete circular surface. In other words, the wavelength conversion module 100A does not have the light pass-through region TR of the wavelength conversion modules 100 and 400, and a reflective region RR is disposed at the position corresponding to the light pass-through region TR of the wavelength conversion modules 100 and 400 to reflect the excitation beam 50.

Specifically, as shown in FIG. 5B, in the present embodiment, when the reflective region RR of the wavelength conversion module 100A enters the irradiating range of the excitation beam 50, the excitation beam 50 is reflected by the reflective region RR of the wavelength conversion module 100A, and then the excitation beam 50 from the wavelength conversion module 100A can be guided to the light splitting unit 220 and reflected to the subsequent filter module 230. On the other hand, in the present embodiment, when the wavelength conversion region WR enters the irradiating range of the excitation beam 50, the excitation beam 50 is converted into the wavelength conversion beam 60 by the wavelength conversion region WR. In an embodiment, the wavelength conversion module 100A can further divide the wavelength conversion region WR into a plurality of regions according to different needs, and correspondingly select a desired phosphor powder in each region to achieve the purpose of generating a plurality of conversion beams.

Thereafter, as shown in FIG. 5B, the wavelength conversion beam 60 from the wavelength conversion module 100A can be guided to the light splitting unit 220 and reflected to the subsequent filter module 230. Thereafter, the filter region (not shown) of the filter module 230 correspondingly enters into the irradiating range of the wavelength conversion beam 60 at different times, for example, to form red color light and green color light respectively through filtering. On the other hand, the light transmissible region (not shown) of the filter module 230 also correspondingly enters the irradiating range of the excitation beam 50 transmitted to the filter module 230 at different times, thereby allowing the excitation beam 50 to passes through, and thereby forming the subsequent illumination beam 70 and image beam 80.

In this way, the wavelength conversion module 100A employed by the projection apparatus 300A is similar to the wavelength conversion module 100 of FIG. 2C or the wavelength conversion module 400 of FIG. 3, and can achieve the same function, therefore the projection apparatus 300A can achieve similar effects and advantages as the projection apparatus 300 described above, and no further details are incorporated herein.

In summary, the embodiments of the present disclosure at least have one of the following advantages or effects. In an embodiment of the present disclosure, the wavelength conversion module of the illumination system of the projection apparatus is designed with two first reflective regions and the second reflective region of the reflective layer configured with different heights, such that the wavelength conversion layers of the wavelength conversion module in different regions have different heights, which allows that some regions of the wavelength conversion layer can be prevented from being directly irradiated on the place where the energy of the laser spot is concentrated. In this way, the wavelength conversion module can have good conversion efficiency and reliability. Moreover, the illumination system and the projection apparatus using the wavelength conversion module can also prevent the laser spot from being focused on the wavelength conversion layer of the wavelength conversion module through the above configuration, and reduce the average energy density that can be withstood by the wavelength conversion layer, thereby avoiding the risks of deterioration and/or burning caused by the bonding material with low resistance to high temperature, which in turn allows for good optical quality and reliability. In addition, the method for forming the wavelength conversion module in the embodiment of the present disclosure can also prevent some regions of the wavelength conversion layer from sitting in a place where the energy of the laser spot is concentrated through the configuration that different regions of the reflective layer have different heights, which enables the wavelength conversion module to achieve good reliability and conversion efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising:
    a substrate, comprising an axis located at a center of the substrate;
    a reflective layer, located on the substrate, and the reflective layer having two first reflective regions and a second reflective region, wherein the second reflective region is located between the two first reflective regions in a radial direction from the axis of the substrate to an edge of the substrate, and a distance from a top of the reflective layer in the second reflective region to the substrate is smaller than a distance from a top of the reflective layer in each of the first reflective regions to the substrate; and
    a wavelength conversion layer, located on the substrate, wherein the reflective layer is located between the substrate and the wavelength conversion layer.

2. The wavelength conversion module according to claim 1, wherein the reflective layer comprises two first reflective layers and a second reflective layer, wherein:
    the two first reflective layers are correspondingly disposed on the two first reflective regions; and
    the second reflective layer is correspondingly disposed on the second reflective region, wherein a thickness of the second reflective layer is smaller than a thickness of each of the first reflective layers.

3. The wavelength conversion module according to claim 2, wherein each of the first reflective layers is a diffuse reflective layer, and the second reflective layer is a high-reflective layer.

4. The wavelength conversion module according to claim 2, wherein each of the first reflective layers and the second reflective layer are diffuse reflective layers.

5. The wavelength conversion module according to claim 1, wherein the reflective layer comprises two first reflective layers and a second reflective layer, wherein:
    the two first reflective layers are correspondingly disposed on the two first reflective regions; and
    the second reflective layer is correspondingly disposed on the two first reflective regions and the second reflective region, wherein in the two first reflective regions, the two first reflective layers cover the second reflective layer.

6. The wavelength conversion module according to claim 5, wherein each of the first reflective layers is a diffuse reflective layer, and the second reflective layer is a high-reflective layer.

7. The wavelength conversion module according to claim 1, wherein there is a distance difference between a distance from a top of the reflective layer in the second reflective region to the substrate and a distance from a top of the reflective layer in each of the first reflective regions to the substrate, and the distance difference ranges from 0.03 mm to 0.50 mm.

8. The wavelength conversion module according to claim 1, wherein the wavelength conversion layer comprises two first wavelength conversion layers and a second wavelength conversion layer, and the two first wavelength conversion layers are disposed on the two first reflective regions of the reflective layer, the second wavelength conversion layer is disposed on the second reflective region of the reflective layer, and tops of the two first wavelength conversion layers of the wavelength conversion layer are aligned with a reference plane, there is a distance difference between a distance from a top of the second wavelength conversion layer to the substrate and a distance from a top of each of the first wavelength conversion layers to the substrate, and the distance difference ranges from 0.03 mm to 0.50 mm.

9. The wavelength conversion module according to claim 1, wherein a ratio of a width of the second reflective region to a width of the reflective layer ranges between 20% and 50%.

10. The wavelength conversion module according to claim 1, wherein the wavelength conversion module further comprises an anti-reflective layer located on the wavelength conversion layer.

11. The wavelength conversion module according to claim 1, wherein the wavelength conversion module further comprises an adhesive layer, at least a portion of the adhesive layer is located between the wavelength conversion layer and the reflective layer.

12. A method of forming a wavelength conversion module, comprising:
    providing a substrate, wherein the substrate comprises an axis located at a center of the substrate;
    forming a reflective layer on the substrate, and the reflective layer having two first reflective regions and a second reflective region, wherein the second reflective region is located between the two first reflective regions in a radial direction from the axis of the substrate to an edge of the substrate, and a distance from a top of the reflective layer in the second reflective region to the substrate is smaller than a distance from a top of the reflective layer in each of the first reflective regions to the substrate; and forming a wavelength conversion layer on the substrate, wherein the reflective layer is located between the substrate and the wavelength conversion layer.

13. The method of forming the wavelength conversion module according to claim 12, wherein the method of forming the reflective layer comprises:
   forming two first reflective layers on the two first reflective regions respectively; and
   forming a second reflective layer on the second reflective region, wherein a thickness of the second reflective layer is smaller than a thickness of each of the first reflective layers.

14. The method of forming the wavelength conversion module according to claim 12, wherein the method of forming the reflective layer comprises:
   forming a second reflective layer on the two first reflective regions and the second reflective region; and
   forming two first reflective layers on the two first reflective regions respectively, wherein in the two first reflective regions, the two first reflective layers cover the second reflective layer.

15. The method of forming the wavelength conversion module according to claim 12, wherein the method of forming the wavelength conversion layer comprises:
   forming a second wavelength conversion layer on the second reflective region; and
   forming two first wavelength conversion layers on the two first reflective regions respectively, wherein tops of the two first wavelength conversion layers are aligned with a reference plane, and there is a distance difference between a distance from a top of the second wavelength conversion layer to the substrate and a distance from a top of each of the first wavelength conversion layers to the substrate, and the distance difference ranges from 0.03 mm to 0.50 mm.

16. An illumination system, comprising:
   a wavelength conversion module, comprising:
      a substrate, comprising an axis located at a center of the substrate;
      a reflective layer, located on the substrate, and the reflective layer having two first reflective regions and a second reflective region, wherein the second reflective region is located between the two first reflective regions in a radial direction from the axis of the substrate to an edge of the substrate, and a distance from a top of the reflective layer in the second reflective region to the substrate is smaller than a distance from a top of the reflective layer in each of the first reflective regions to the substrate; and
      a wavelength conversion layer, located on the substrate, wherein the reflective layer is located between the substrate and the wavelength conversion layer; and
   an excitation light source, configured to emit an excitation beam, wherein the excitation beam is transmitted to the wavelength conversion module and converted into an illumination beam through the wavelength conversion module.

17. The illumination system according to claim 16, wherein the wavelength conversion layer comprises two first wavelength conversion layers and a second wavelength conversion layer, and the two first wavelength conversion layers are disposed on the two first reflective regions of the reflective layer, the second wavelength conversion layer is disposed on the second reflective region of the reflective layer, and tops of the two first wavelength conversion layers of the wavelength conversion layer are aligned with a reference plane, and when the excitation beam is transmitted to the wavelength conversion module, the excitation beam is focused on the reference plane, the excitation beam forms a light spot on the wavelength conversion module, two first portions of the light spot are respectively located on the two first wavelength conversion layers, a second portion of the light spot is located on the second wavelength conversion layer, and a focus point of the excitation beam is located above the second portion of the light spot.

18. A projection apparatus, comprising:
   an illumination system, comprising:
      a wavelength conversion module, comprising:
         a substrate comprising an axis located at a center of the substrate;
         a reflective layer, located on the substrate, and the reflective layer having two first reflective regions and a second reflective region, wherein the second reflective region is located between the two first reflective regions in a radial direction from the axis of the substrate to an edge of the substrate, and a distance from a top of the reflective layer in the second reflective region to the substrate is smaller than a distance from a top of the reflective layer in each of the first reflective regions to the substrate; and
         a wavelength conversion layer, located on the substrate, wherein the reflective layer is located between the substrate and the wavelength conversion layer; and
      an excitation light source, configured to emit an excitation beam, wherein the excitation beam is transmitted to the wavelength conversion module and converted into an illumination beam through the wavelength conversion module;
   a light valve, located on a transmitting path of the illumination beam and is configured to convert the illumination beam into an image beam; and
   a projection lens, located on a transmitting path of the image beam and is configured to convert the image beam into a projection beam.

19. The projection apparatus according to claim 18, wherein the wavelength conversion layer comprises two first wavelength conversion layers and a second wavelength conversion layer, and the two first wavelength conversion layers are disposed on the two first reflective regions of the reflective layer, the second wavelength conversion layer is disposed on the second reflective region of the reflective layer, and tops of the two first wavelength conversion layers of the wavelength conversion layer are aligned with a reference plane, and the excitation beam is focused on the reference plane when the excitation beam is transmitted to the wavelength conversion module.

20. The projection apparatus according to claim 19, wherein when the excitation beam is transmitted to the wavelength conversion module, the excitation beam forms a light spot on the wavelength conversion module, and two first portions of the light spot are respectively located on the two first wavelength conversion layers, a second portion of the light spot is located on the second wavelength conversion layer, and a focus point of the excitation beam is located above the second portion of the light spot.

* * * * *